(12) United States Patent  
Vitalo et al.

(10) Patent No.: US 8,555,053 B1
(45) Date of Patent: Oct. 8, 2013

(54) SYSTEM AND METHOD FOR ADJUSTING TO DRIVE SPECIFIC CRITERIA

(75) Inventors: Michael Joseph Vitalo, Austin, TX (US); Michael Baines Gosha, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 848 days.

(21) Appl. No.: 12/201,956

(22) Filed: Aug. 29, 2008

(51) Int. Cl.
*H04L 9/32* (2006.01)
*G06F 13/12* (2006.01)
*G06F 13/38* (2006.01)

(52) U.S. Cl.
USPC ............. 713/153; 713/150; 710/62; 710/65; 710/66; 710/68

(58) Field of Classification Search
USPC ............ 713/189, 193, 150, 153, 192; 380/37; 707/100; 710/62, 65, 66, 68
See application file for complete search history.

(56) References Cited

U.S. PATENT DOCUMENTS

| | | | |
|---|---|---|---|
| 7,596,570 B1 * | 9/2009 | Emigh et al. ................. | 1/1 |
| 7,934,105 B1 * | 4/2011 | Buckingham ................. | 713/193 |
| 7,962,763 B2 * | 6/2011 | Trezise et al. ................. | 713/193 |
| 8,082,058 B2 * | 12/2011 | Thompson et al. ........... | 700/214 |
| 2002/0095537 A1 * | 7/2002 | Slater ............................. | 710/65 |
| 2006/0164928 A1 * | 7/2006 | Starr et al. .................. | 369/30.01 |
| 2007/0094309 A1 * | 4/2007 | Buckingham et al. ........ | 707/202 |
| 2007/0180272 A1 * | 8/2007 | Trezise et al. ................. | 713/193 |
| 2007/0195447 A1 * | 8/2007 | Starr et al. .................... | 360/72.1 |

OTHER PUBLICATIONS

Dell PowerVault 132T Tape Library [Retrieved from http://www.euro.dell.com on Dec. 1, 2008], 4 pages.
Specifications: Dell PowerVault 132T Tape Library User's Guide [Retrieved from http://support.dell.com/support/edocs/Stor-sys/132TLTO2/en/ug_tl/specs.htm on Dec. 1, 2008], 4 pages.
Sony SAIT Tape Drive [Retrieved from http://www.cpuinc.com/sony_sait_tape_drive.html on Dec. 1, 2008], 2 pages.
Sony S-AIT Tape drive, SONY Super AIT Tape Drive, Sony SAIT Tape drive, new, used, refurbished and repair [Retrieved from http://www.9to5computer.com/SONY/Sony-S-AIT-Tape-Drive.htm on Dec. 1, 2008], 6 pages.

* cited by examiner

*Primary Examiner* — Tae Kim
(74) *Attorney, Agent, or Firm* — Sprinkle IP Law Group

(57) ABSTRACT

Embodiments provide systems and methods for adjusting to drive specific criteria. Data blocks sent to a drive may be padded to a constant size over a period to ensure optimal drive performance. Systems for padding data blocks to a constant size over a period may include padding logic which may pad data blocks addressed to a drive to a constant size over a period. The padding logic may be contained in an appliance located upstream of the drive in a network. The appliance may be operable to intercept data blocks addressed to the drive over a period, pad the data blocks to a constant size and forward the data blocks to the drive such that the drive receives data blocks of a constant size over a period.

20 Claims, 5 Drawing Sheets

SYSTEM AND METHOD FOR ADJUSTING TO DRIVE SPECIFIC CRITERIA

TECHNICAL FIELD OF THE INVENTION

This disclosure describes various methods and systems for adjusting to drive specific criteria. More particularly, embodiments include methods and systems for adjusting the data sent to a drive to comport with drive specific criteria of the drive. Even more particularly, embodiments include methods and systems for padding data blocks sent to a drive over a period to a substantially constant size.

BACKGROUND

Data represents a significant asset for many entities. Consequently, securing stored data against theft and/or data loss, whether accidental or caused by malicious activity is enormously important. Failure to do so can be costly in terms of wasted manpower, loss of goodwill from customers, loss of time and/or potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage such as, for example, multiple magnetic tapes. Centralized data backup has the advantage of increased volume, efficiency and redundancy.

In many systems, the data to be backed up and backup commands are sent over a network from multiple machines on the network to a library. One example of a library commonly used in enterprise backup systems is a magnetic tape library. A magnetic tape library can comprise components such as tape cartridges (containing magnetic tape), robots, tape slots and tape drives. A typical magnetic tape library contains one or more tape drives which write received data to one or more tape cartridges.

SUMMARY

Embodiments provide systems and methods for adjusting to drive specific criteria. In one embodiment, a method for adjusting a variable block write size of a plurality of data blocks to be substantially constant over a period of time is discussed that may include padding data blocks addressed to a drive to a substantially constant size. In one embodiment, a method for adjusting to drive specific criteria may include compressing or encrypting data in one or more data blocks of a plurality of data blocks sent to a drive and padding the one or more data blocks to a constant size over a period such that the drive receives data blocks of the constant size over the period. In one embodiment, padding data blocks addressed to a drive to a constant size over a period may be implemented at padding logic and such padding logic may be a part of an appliance which may be located within a network upstream of the drive.

Embodiments of methods and systems for adjusting to drive specific criteria of a library drive can include a system comprising a controller and a set of computer instructions executable by the controller to implement the above-described method. Other embodiments may include a software product comprising computer instructions executable to implement the above-described method. In a further embodiment, computer readable media may contain computer instructions operable to implement the above-described method.

Embodiments of methods and systems described above allow for adjusting to drive specific criteria. More specifically, embodiments of above systems and methods allow for blocks of data of substantially constant size to be sent to a drive for processing. More particularly, in the context of the SCSI protocol or commands or the equivalent, the block sizes of SCSI variable block write commands are substantially constant over periods of time. Allowing for data blocks having a substantially constant size to be sent to a drive such as, for example, various Sony manufactured drives, may allow for the maximization of drive performance and prevent variance in the size of data blocks sent to a drive over a period of time.

BRIEF DESCRIPTION OF THE FIGURES

A more complete understanding of embodiments of systems and methods and the advantages thereof may be acquired by referring to the following description, taken in conjunction with the accompanying drawings in which like reference numbers indicate like features and wherein.

DETAILED DESCRIPTION

Figure 1:
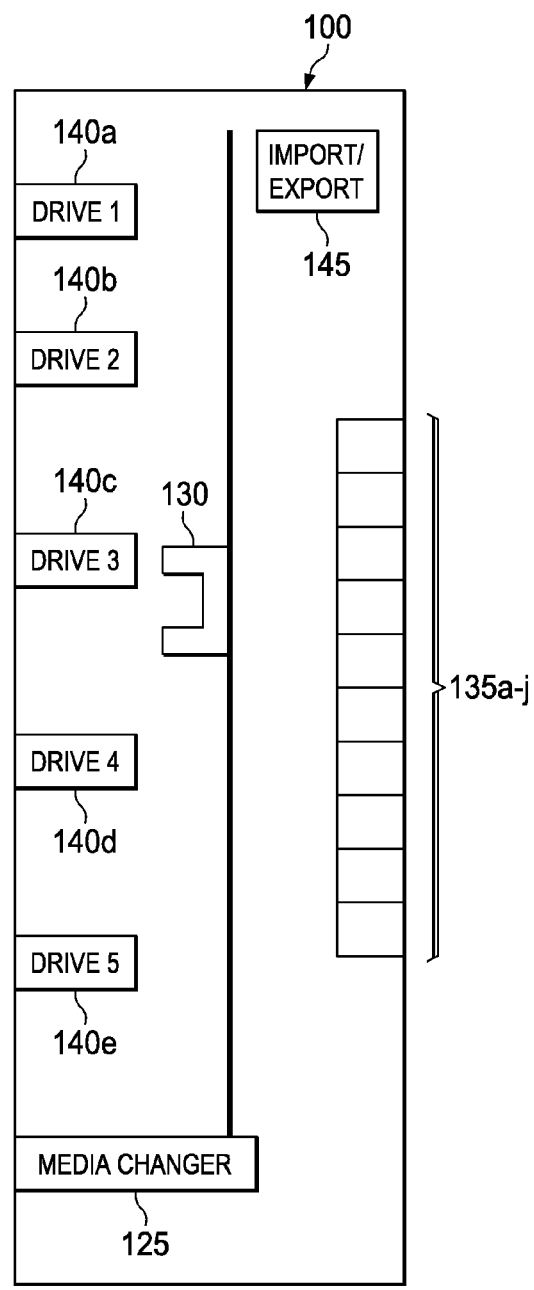
FIG. 1 is a diagrammatic representation of one embodiment of a library.

Preferred embodiments are illustrated in the FIGURES, like numerals being used to refer to like and corresponding parts of the various drawings.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Language designating such nonlimiting examples and illustrations includes, but is not limited to: "for example", "for instance", "e.g.", "in one embodiment".

Tape drives, or other drives, may have criteria, which may be referred to as drive specific criteria, that may be met to maximize performance or prevent substandard performance. More particularly, some tape drives may exhibit a performance decrease when the size of data blocks to be processed by the drive varies or fluctuates. For example, in some embodiments of tape drives, when the data block sizes of SCSI variable write commands vary over periods of time, the rate at which data is processed by the drive decreases.

This disclosure describes various systems and methods for adjusting to drive specific criteria. This disclosure will describe embodiments of systems and methods with regard to tape drives, but is applicable to any system comprising drives or equivalents. More specifically, data sent to a drive may be padded such that data blocks of a relatively constant size are sent to the drive over a period of time. In one embodiment, in the context of Small Computer System Interface commands and data transfer, the variable block write size is dynamically adjusted such that the size of data blocks sent to a drive is substantially constant over a period. This may be achieved by padding data blocks such that the data blocks are of a substantially constant size. Padding data blocks may comprise padding the blocks with zeros or other data to be at or near the size of a write command sent by an initiator. In a further embodiment, because padding data blocks may increase the overall amount of data transferred over a network to a drive or equivalent, the size of the data blocks to be transferred to a drive may be monitored over time and data blocks may be padded out to a size of the largest data block over a period of time. By padding data blocks to the size of a largest data block, the relative amount of data to be transferred to the drive over the network may be minimized and the data throughput to the drive may be maximized.

FIG. 1 is a diagrammatic representation of one embodiment of a tape library 100. Library 100 can comprise drives 140a-140e, media changer 125 and associated robot 130, import/export element(s) 145 and slots 135a-135j. It should be understood that the number of drives and slots or other library elements or components shown in library 100 are exemplary and library 100 may comprise any number of drives, slots or other elements or components as is necessary or desired. Drives 140a-140e can read/write data from/to magnetic tape (contained within cartridges), eject tape cartridges and perform other operations. Drives 140a-140e may have the ability to compress received data before writing the data to tape cartridges. Slots 135a-135j store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be read from the tape cartridge. It should be noted that some libraries may employ a single robot or multiple robots in an expandable or modular configuration. Components of libraries such as a drive of drives 140a-140e may have one or more criteria which should be met to optimize performance of the library or components of the library. In one example, the performance of a drive may suffer when blocks of data varying in size over a period of time are sent to the library drive.

In one embodiment, Small Computer System Interface ('SCSI') commands, in particular, SCSI write commands, may be utilized to transfer data to a drive or drives of a library, such as library 100 described above. SCSI write commands may include SCSI variable write commands. The issuance of a SCSI write command may result in a data block containing data being sent to a drive over a network or equivalent. In embodiments in which SCSI variable write commands are utilized to transfer data blocks to a drive, the size of the data blocks associated with SCSI variable write commands received at one or more drives may vary such that data blocks of varying sizes are sent to a drive over a period.

Prior to being transferred to a drive, data in data blocks may be compressed or encrypted. Because different data may have different compressibilities and because encryption may irregularly change the size of data, after compression or encryption, write data blocks may vary in size even if the data was received from a source device in blocks all having the same size. The SCSI variable write command can be used to send data blocks having variable sizes to a destination device.

However, the performance of a drive may suffer if the drive receives data blocks of different sizes over a period. More particularly, the ability of the drive to write data to media may suffer such that the speed at which the drive processes data in data blocks or writes data to media may be reduced. To adjust to this drive specific criteria, data blocks may be padded to a substantially constant size such that data blocks transferred to a drive are of a substantially constant size over a period. In one embodiment, data blocks may be padded to the size of one or more data blocks sent by an initiator to achieve a performance characteristic. Thus, in one embodiment, padding of data blocks may be done based on knowledge of drive specific criteria of the drive receiving the data blocks. For example, such knowledge may include whether a drive needs to receive data blocks of a constant size to achieve a performance (e.g. padding may not always be done). Also, the size of data blocks may be optimized for particular drives or types of drives. An initiator, for example, may have knowledge about a drive or drives and the data block sizes or padding that may be used to achieve a desired performance characteristic.

Figure 2:
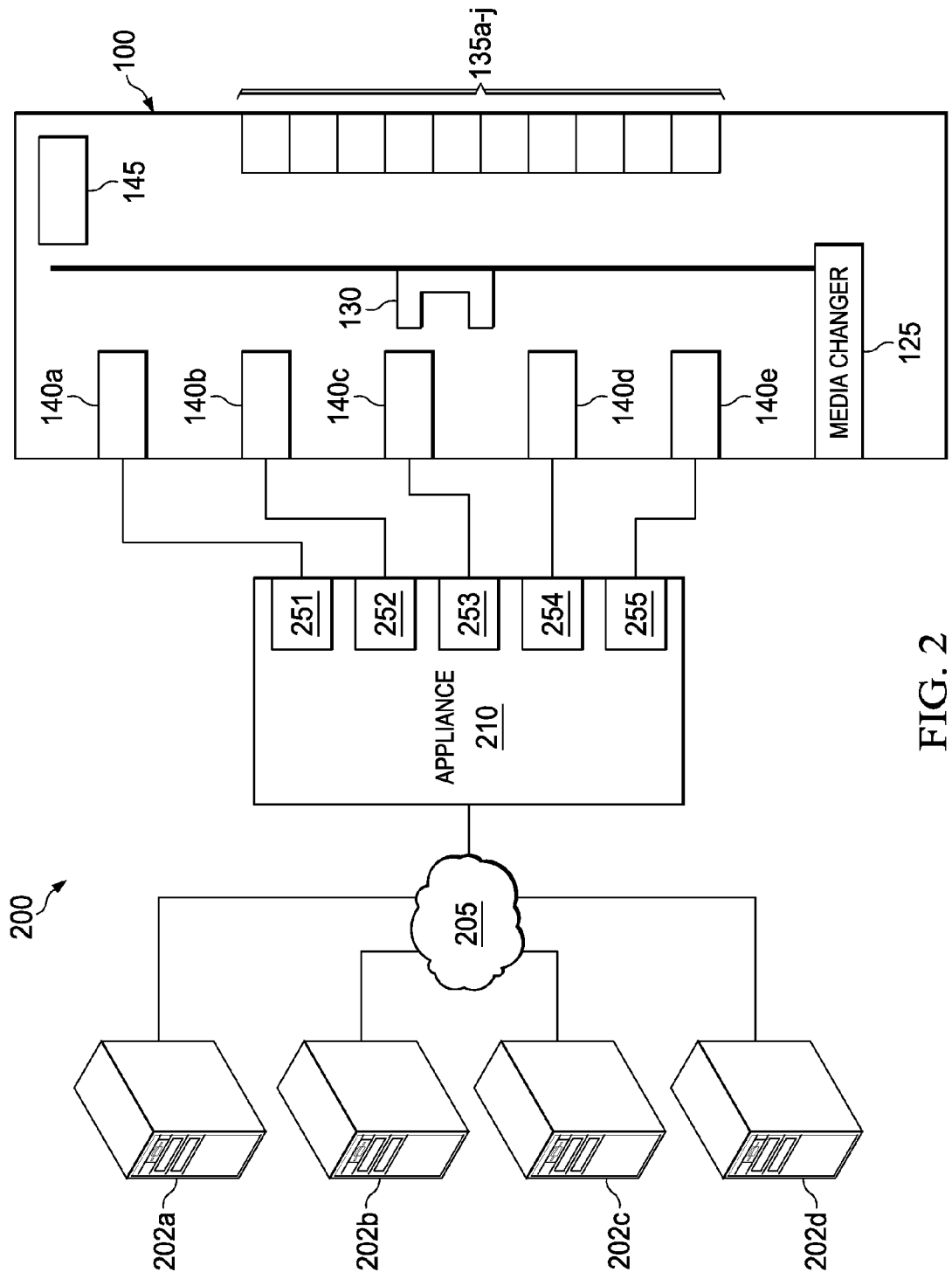
FIG. 2 is a diagrammatic representation of one embodiment of a network comprising an encryption appliance.

FIG. 2 is a diagrammatic representation of one embodiment of a system 200 in accordance with the invention in which a plurality of initiators 202a-202d have access to library 100 over network 205, where appliance 210 connects both network 205 and library 100. Network 205 can comprise the Internet, a SAN, a LAN, a WAN, a wireless network or any other communications network for transferring data known in the art. Hosts 202a-202d are coupled to library 100 via network 205 through appliance 210 and can communicate using FC, SCSI, iSCSI, TCP/IP, SATA or other protocols. Similarly, library 100 can communicate with network 205 over any suitable communications link or network known in the art and can use additional protocols such as FC, SCSI, iSCSI, TCP/IP, SATA or other protocol known in the art. As shown in the embodiment of FIG. 2, communications from initiators 202a-202d to library 100 and devices of library 100 and communications from library 100 and devices of library 100 to initiators 202a-202d via network 205 are intercepted by appliance 210.

As depicted in the embodiment of FIG. 2, appliance 210 is an in-line device upstream of library 100 operable to receive data blocks sent over network 205 and forward the received data blocks to one or more drives 140a-140e of library 100. In particular, data blocks destined for library 100 sent over network 205 may be intercepted by appliance 210. The data in intercepted data blocks to be sent to a particular drive may be compressed or encrypted and sent to the appropriate drive (for example, a drive of drives 140a-140e) through a corresponding port (for example, a port of ports 251-255) of appliance 210.

More particularly, in one embodiment of encryption appliance 210 of FIG. 2, each port may be associated with a World Wide Port Name ("WWPN") or a World Wide Node Name ("WWNN"). A WWPN or a WWNN may have one or more portions such as, for example, a Hi portion or a Lo portion which may be used to uniquely identify devices in a network or in a library such as library 100. Thus, appliance 210 may utilize a portion of a WWPN or WWNN to determine the destination at a library of data blocks containing encrypted or unencrypted data. For example, drive 410a of library 100 may have a WWPN or a WWNN and may be coupled to port 251 of appliance 210. Thus, port 251 may be associated with the WWPN or the WWNN of drive 140a such that when data blocks are intercepted by appliance 210 which are destined for drive 140a, appliance 210 may transmit data blocks to drive 140a by sending the data to the library via port 251. For example, data blocks received at appliance 210 may be transferred to the port 251 based upon a WWPN or WWNN identifying destination drive 140a in the data blocks. Thus, library ports 251-255 may be individually connected to individual library components and individual library components may have an associated WWNN or WWPN which may be utilized to uniquely reference the component, such as a specific drive of library 100.

Because in system 200, appliance 210 sits in-line between network 205 and is consequently able to intercept data blocks sent over network 205 to library 100, appliance 210 is able to adjust the sizes of data blocks sent to drives 140a-140e of library 100 by padding data blocks with zeros or other data. In one embodiment, appliance 210 may contain a table listing the element numbers and corresponding WWNNs or WWPNs of drives such that the element number of a drive can be correlated to the WWNN or WWPN of that drive. When appliance 210 receives one or more data blocks destined for a specific drive such as, for example, data blocks addressed to the WWNN or WWPN of the specific drive, the appliance 210 may compress data contained in the data blocks, encrypt the compressed data, pad out the data such that the data blocks are of a substantially constant size and send the compressed, encrypted and padded data blocks to the drive. The drive can then write the data blocks to media such as, for example, magnetic tape contained within a tape cartridge.

Generally, compression of data occurs before encryption because encrypted data is usually non-compressible, thus it is generally necessary to compress data before encrypting the data. In one embodiment, data added to one or more data blocks to pad the data blocks is not compressed or encrypted. Both compression or encryption may change the size of data blocks because after compression or encryption, the number of bytes of data in a data block may have changed. Because different data may have different compressibilities, compressing data across multiple data blocks may result in data blocks of non-constant size. Similarly, encryption algorithms may change the size of data blocks such that one or more data blocks are of non-constant size. In some embodiments, data blocks may include a header containing information regarding the data in the data block, such as, for example, the size of the data block or the amount of data in the data block. Header information may be modified to account for compression, encryption and padding. Such modification of the header may occur after a data block has had compression, encryption and padding applied to it. While the above process has been specifically described, this is by way of example, not limitation: other methods of ensuring that data blocks substantially constant in size over a period of time are transferred to a drive. For example, in some embodiments, data to be sent to a drive may not be compressed or encrypted.

Because a drive may be able to compress data and because data used to pad out one or more data blocks may not have been compressed or encrypted, compression at the drive may remove or compress the padding in one or more data blocks, thus minimizing the amount of data written to media and maximizing the amount of data stored on media. In addition, different drives may receive different sized data blocks so long as any one drive receives data blocks of a substantially constant size: that is, a first drive may receive data blocks padded to a first size and a second drive may receive data blocks padded to a second size. In one embodiment, data blocks addressed to a drive may be padded to a size specified by a write command sent by an initiator.

An initiator may desire to achieve a certain performance characteristic and a data block size specified in a write command sent by the initiator may achieve such a performance characteristic, thus it may be desired to pad data blocks to a size specified by a write command to achieve a desired performance characteristic. In a further embodiment, the size of the data blocks to be transferred to a drive may be monitored over time and data blocks may be padded out to a size of a largest data block over a period of time. By padding data blocks to the size of a largest data block, the relative amount of data to be transferred to the drive over the network may be minimized and the data throughput to the drive may be maximized. In a specific embodiment, a drive may achieve optimal performance when receiving data blocks containing 64 kB of data: thus data blocks sent to the drive may be padded to contain 64 kB of data such that the size of the data block sent to the drive may be 65 kB including header information or other information.

Figure 3:
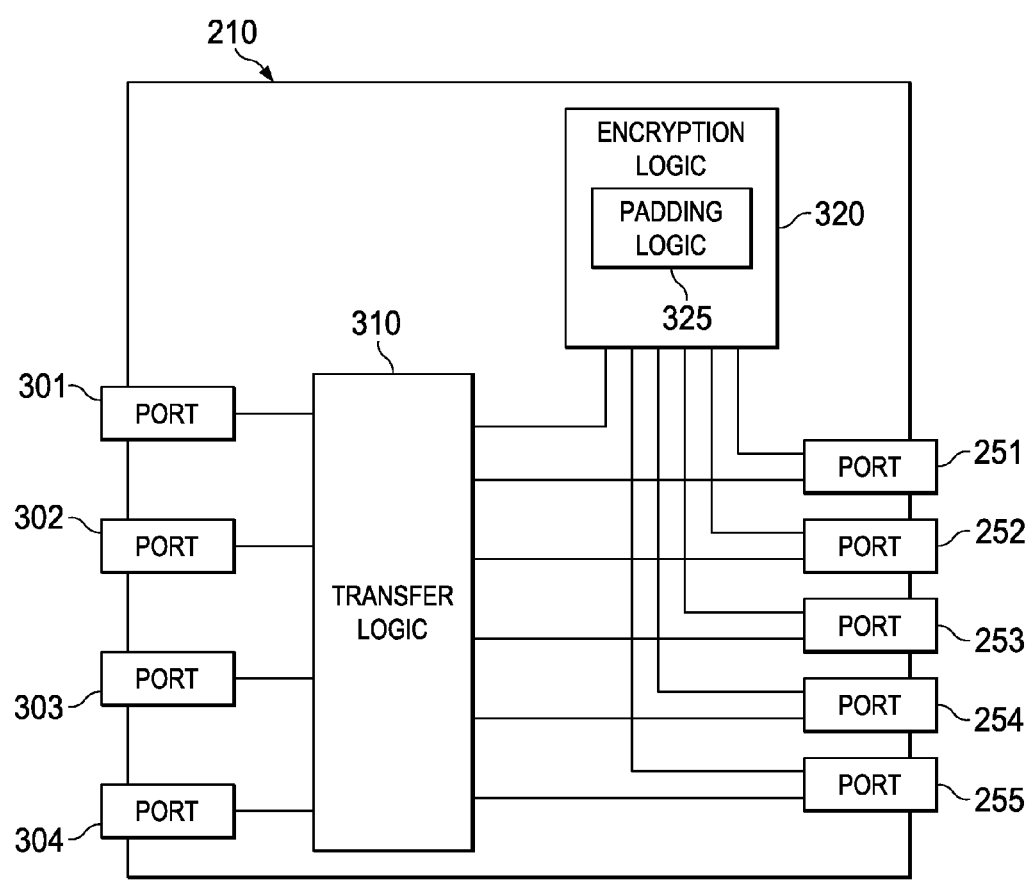
FIG. 3 is a diagrammatic representation of one embodiment of an encryption appliance.

FIG. 3 is a diagrammatic representation of one embodiment of appliance 210 in accordance with one embodiment of the invention. Appliance 210 may be an interface between a network and one or more drives such as drives 140a-140e of library 100 of FIG. 1. Appliance 210 may comprise network ports 301-304, transfer logic 310, encryption logic 320, padding logic 325 and drive ports 251-255 which may be connected to one or more drives. In one embodiment, ports 301-304 or ports 251-255 may comprise one or more Fibre Channel cards or portions thereof or one or more PCI cards or portions thereof. Network ports 301-304 may receive data from one or more networks. Data received at network ports 301-304 is passed to transfer logic 310 which identifies data to be encrypted. Generally, data received at network ports 301-304 is contained in data blocks which may be of a substantially constant size over a period. The data in each data block is generally destined for common destination and it may be desired to encrypt data in one or more data blocks. Data blocks containing data to be encrypted are forwarded to encryption logic 320 for encryption while data blocks containing data that will not be encrypted are passed to the appropriate library port for transmission to the appropriate drive. Because encrypted data is generally non-compressible, prior to encryption, data to be encrypted may be compressed. Data in data blocks transferred to encryption logic 320 is encrypted and the data blocks are passed to the appropriate library port of ports 251-255 for transmission to the appropriate drive. Because either compression or encryption may change the amount of data inconsistently, after compression or encryption, data blocks containing compressed or encrypted data may not be of constant size. Prior to being passed to the appropriate port for transmission to the appropriate drive, data blocks may be padded to a substantially constant size, such that data blocks received by the drive are of substantially constant size for a period. In further embodiments, the data blocks may include a header containing information regarding the size of the data block or the amount of data in the data block. Such information in the header may be updated to account for the padding added to the data block. In one embodiment, padding functionality or header update or modification functionality may be implemented at padding logic 325 which may be part of encryption logic 320 of FIG. 3. In an alternative, padding functionality or header update or modification functionality may be implemented at padding logic which may be external to encryption logic 320. Padding logic may be implemented by either hardware or software or a combination of hardware and software. In one embodiment, encryption logic 320 or padding logic 325 may be implemented utilizing an encryption device such as a PCI card which may be utilized to encrypt data. An example of such a PCI card is the SafeXcel 182-PCI Card, by SafeNet Incorporated. In another embodiment, transfer logic 310, encryption logic 320 and padding logic 325 may be implemented utilizing the same device or set of devices, for example, transfer logic 310, encryption logic 320 and padding logic 325 may be implemented in firmware on a controller or by software executed by a processor.

Figure 4:
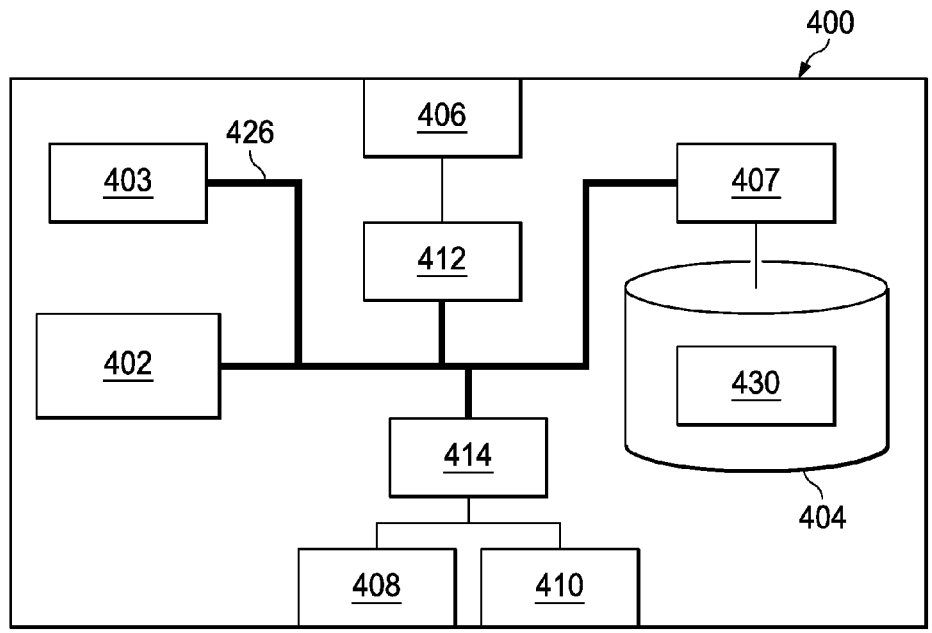
FIG. 4 is a diagrammatic representation of one embodiment of a controller which can be used in an encrypting appliance.

Turning now to FIG. 4, FIG. 4 is a diagrammatic representation of one embodiment of an appliance controller 400 ("controller 400") which may be operable to store and execute software implementing transfer logic functionality or encryption logic functionality. For example, in one embodiment, controller 400 can implement transfer logic 310, encryption logic 320 or padding logic 325 of FIG. 3 or portions thereof. Controller 400 can include a processor 402, such as an Intel Pentium 4 based processor (Intel and Pentium are trademarks of Intel Corporation of Santa Clara, Calif.), a primary memory 403 which, in one embodiment, may be RAM, ROM, Flash Memory, EEPROM or other computer readable medium known in the art and a secondary memory 404 which, in one embodiment, may be a hard drive, disk drive, optical drive or other computer readable medium known in the art. A memory controller 407 can control access to secondary memory 404. Controller 400 can comprise a communications interface 406 which, in one embodiment, may be a fibre channel interface, Ethernet port or other communications interface known in the art, to connect controller 400 to a network switch or other network interface. An I/O controller 412 can control interactions with the switch. Similarly, an I/O controller 414 can control interactions over I/O interfaces 408 and 410. Controller 400 can include a variety of input devices. Various components of controller 400 can be connected by a bus 426.

Secondary memory 404 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 404 can store a software program 430 that implements transfer logic functionality, encryption logic functionality and padding and header modification functionality such that when executed, software program 430 may compress, encrypt and pad data blocks such that data blocks sent to a drive are of a substantially constant size over a period. During execution by processor 402, portions of program 430 can be stored in secondary memory 404 and/or primary memory 403.

Figure 5:
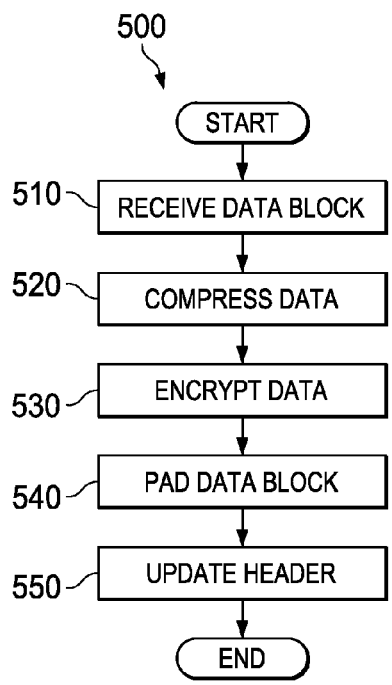
FIG. 5 is a flowchart illustrating a method for adjusting to tape drive specific criteria according to one embodiment.

FIG. 5 is diagrammatic representation of a flow chart 500 illustrating one embodiment of a method for adjusting to drive specific criteria. According to one embodiment, the method of FIG. 5 can be implemented as a set of computer executable instructions stored on a computer readable medium at, for example, appliance 210 of FIG. 2. The set of computer executable instructions can, when executed, pad data blocks with zeros or other data such that data blocks sent to a drive may be of a substantially constant size over a period.

At step 510 of flowchart 500, one or more data blocks are received at, for example, an appliance such as appliance 210 of FIG. 2 or other device. In one embodiment, one or more data blocks received at step 510 may be of substantially constant size over a period. At step 520, the data in the one or more data blocks is compressed. At step 530, the data in the one or more data blocks is encrypted. Because encrypted data may be non-compressible, in some embodiments, the compression at step 520 is performed on a data block before encryption of the data in the data block is performed at step 530. Because different data may have different compressibilities and because encryption, depending upon the encryption algorithm applied, may affect data differently, subsequent to step 520 (compression) or step 530 (encryption) the number of bytes of data in the data blocks may vary and consequently, the data blocks may be of non-constant size over a period. At step 540 of flowchart 500, data blocks may be padded with zeros or other data such that data blocks destined for a particular drive are of a substantially constant size over a period. At step 550, the headers of the data blocks may be updated or modified to reflect the size of the padded data blocks. More particularly, a data block may have a header or the equivalent which specifies the size of the data block or the amount of data contained with the data block, for example, the number of bytes within the data block. Because padding a data block with zeros or other data may affect the number of bytes within the data block, the header may be modified such that the number of bytes specified by the header is congruent with the number of bytes contained within the data block, including the padded zeros or other data.

While one embodiment of a method for adjusting to drive specific criteria by padding data blocks to a substantially constant size is shown in flowchart 500 of FIG. 5, this is by way of illustration, not limitation and other embodiments of a method for adjusting to drive specific criteria may have more or less steps or one or more steps shown above may be combined. For example, step 520 (compression) or step 530 (encryption) may be omitted in one or more embodiments. In addition, one or more steps may be added. For example, in addition to the steps described in flowchart 500, the size of data blocks to be transferred to one or more drives may be monitored subsequent to step 530 (encryption), but prior to step 540 (padding), and data blocks may be padded out to the size of the largest encrypted data block over a period, including the header. By monitoring the encrypted data blocks and padding out to the size of the largest encrypted data block, the amount of padding per data block may be minimized, maximizing data throughput to drives.

Figure 6:
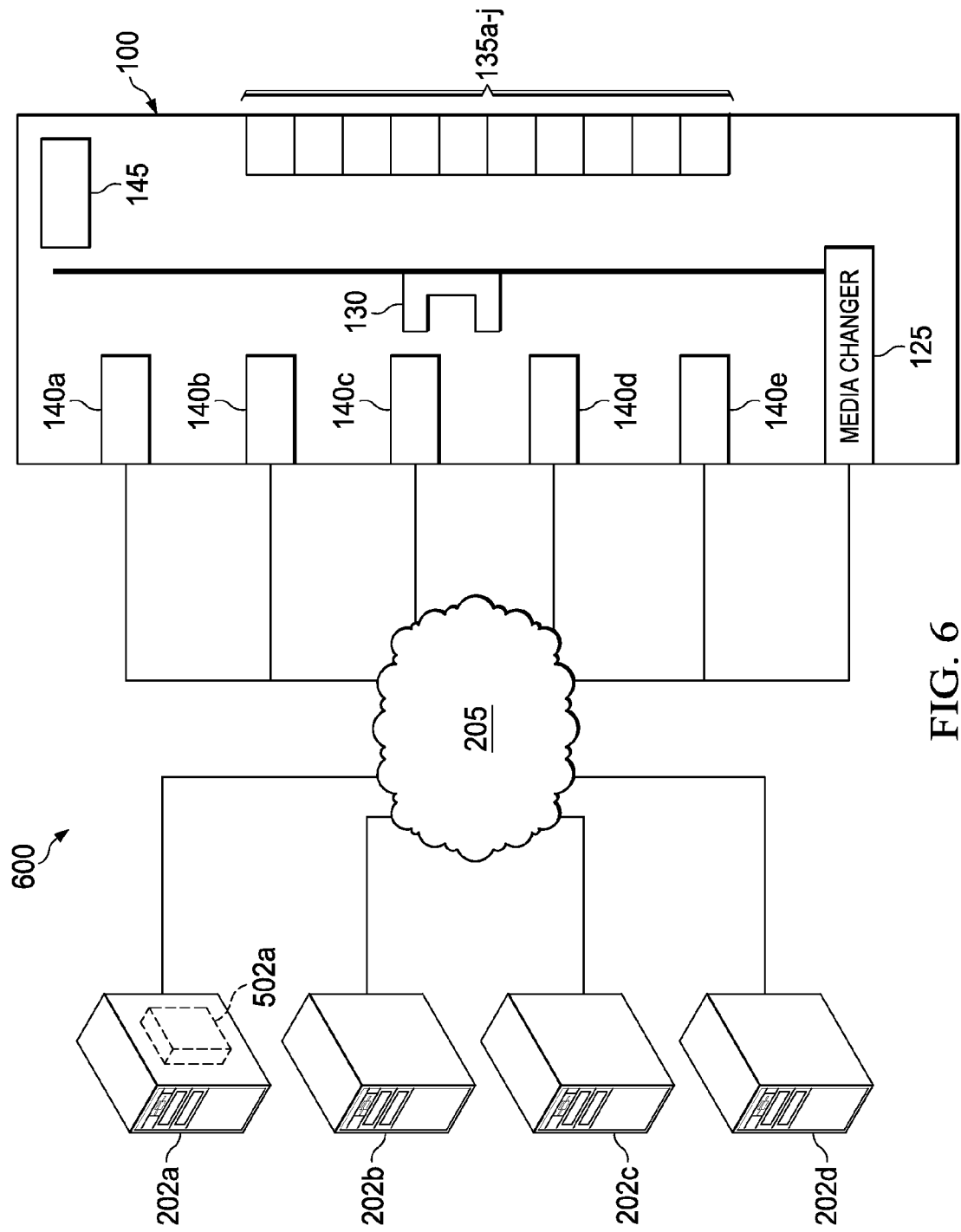
FIG. 6 is a diagrammatic representation of one embodiment of a network.

Turning now to FIG. 6, FIG. 6 is a diagrammatic representation of an embodiment of a system 600 operable to adjust to drive specific criteria. Rather than appliance 210, which is a physical device, being utilized to pad data blocks sent to a drive to a substantially constant size over a period, in system 600 of FIG. 6 functionality of transfer logic 310, encryption logic 320 and padding logic 325 of FIG. 3 is implemented at hosts 202*a*-202*d*. Software, such as, for example, software operable to implement the steps of flowchart 500 of FIG. 5, may be executed by hosts 202*a*-202*d* to pad data blocks such that data blocks sent to a drive are of a substantially constant size over a period.

For example, host 202*a* of FIG. 6 may contain a program 502*a* which may have the capability to compress and encrypt data in data blocks sent to one or more drives 140*a*-140*e* of library 100 over network 205. More particularly, program 502*a*, when executed, may monitor the size of compressed or encrypted data blocks sent to a drive and may pad out data blocks such that data blocks sent to a drive, for example drive 140a of library 100, are of substantially constant size over a period. In a further embodiment, program 502a may be able to coordinate with other hosts, for example, hosts 202b-202d, to monitor the size of data blocks sent to drive 140a from other hosts and pad out the data blocks it sends to drive 140a based on the size of monitored data blocks. Each of hosts 202b-202d may have similar programs executing, such that data blocks sent from hosts 202a-202d to drive 140a of library 100 are padded out to a substantially constant size such that the data blocks received by drive 140a from hosts 202a-202d over network 205 are of substantially constant size over a period.

While shown as a physical media library in FIGS. 2 and 6, library 100 of FIGS. 2 and 6 can be a virtual media library, that is, a virtual representation of one or more physical media libraries as presented by a network switch, a library controller or other component. Examples of library virtualization are described in U.S. patent application Ser. No. 10/704,265, entitled SYSTEM AND METHOD FOR CONTROLLING ACCESS TO MULTIPLE PHYSICAL MEDIA LIBRARIES, and U.S. patent application Ser. No. 10/703,965, entitled SYSTEM AND METHOD FOR CONTROLLING ACCESS TO MEDIA LIBRARIES, both of which are hereby incorporated by reference herein.

Embodiments can also be implemented with respect to devices other than tape drives. For example, embodiments of systems and methods described herein may be used with devices which receive and write data to media and which are most effective when receiving data blocks of a substantially constant size over a period.

While embodiments have been described with particularity, it should be understood that the embodiments are illustrative and that the scope of the invention is not limited to these embodiments. Many other variations, modifications, additions and improvements to the embodiments described above are possible. It is contemplated that these variations, modifications, additions and improvements fall within the scope of the invention as detailed in the following claims.

What is claimed is:

1. A system for adjusting to drive specific criteria, comprising:
    one or more hosts operating on one or more machines, the one or more hosts being configured to send one or more data blocks over a network;
    a media library coupled to the network and comprising a plurality of data storage devices including a destination drive configured to receive a plurality of data blocks over the network over a period of time;
    a control logic residing on the network between the one or more hosts and the media library, the control logic including:
        encryption logic configured to encrypt data in one or more data blocks of the plurality of data blocks received from the one or more hosts; and
        padding logic configured to determine if data should be padded to a constant size which is specific to the destination drive and if so:
            pad the plurality of data blocks to the constant size; and
            write the plurality of padded data blocks to the destination drive over a small computer system interface (SCSI) to the destination drive in the media library using a SCSI variable write command.

2. The system of claim 1, wherein the padding logic is further configured to monitor the size of the data blocks of the plurality of data blocks and adjust the padding to pad one or more data blocks of the plurality of data blocks to a size of a largest data block of the plurality of data blocks.

3. The system of claim 1, further comprising compression logic configured to compress data in one or more data blocks of the plurality of data blocks.

4. The system of claim 1, wherein the padding logic is implemented as part of the encryption logic.

5. The system of claim 4, wherein the control logic is implemented at an appliance.

6. The system of claim 5, wherein the appliance is in-line between the one or more hosts and the destination drive.

7. A method for adjusting to drive specific criteria of a destination drive, comprising:
    at an interface device between one or more hosts on one or more networks and one or more data storage devices which include the destination drive:
        encrypting data in one or more data blocks of a plurality of data blocks to be sent to the destination drive, wherein the plurality of data blocks is from the one or more hosts on the one or more networks, wherein a control logic on the interface device performs the encrypting;
        determining drive specific criteria that are specific to the destination drive, wherein the drive specific criteria include a constant size specific to the destination drive;
        padding the one or more data blocks to the constant size specific to the destination drive over a period of time, wherein the control logic on the interface device performs the padding; and
        writing the one or more padded data blocks to the destination drive over a small computer system interface (SCSI) to the destination drive in the media library using a SCSI variable write command.

8. The method of claim 7, further comprising compressing data in data blocks of the plurality of data blocks sent to the destination drive.

9. The method of claim 7, further comprising updating header information indicating a data block size in the one or more data blocks to include the padding.

10. The method of claim 7, wherein the one or more data blocks are padded to a size specified by a write command sent by an initiator.

11. The method of claim 7, wherein the one or more data blocks are padded to a size of a largest data block.

12. A software product comprising a non-transitory computer readable medium storing a set of computer instructions, the computer instructions executable by a computer processor at an interface device between one or more hosts on one or more networks and one or more data storage devices which include a destination drive, the computer instructions when executed by the computer processor at the interface device:
    encrypt data in one or more data blocks of a plurality of data blocks to be sent to the destination drive, wherein the plurality of data blocks is from the one or more hosts on the one or more networks;
    determine drive specific criteria that are specific to the destination drive, wherein the drive specific criteria include a constant size specific to the destination drive;
    pad the one or more data blocks to the constant size specific to the destination drive over a period of time; and
    write the one or more padded data blocks to the destination drive over a small computer system interface (SCSI) to the destination drive in the media library using a SCSI variable write command.

13. The software product of claim 12, further comprising computer instructions executable to compress data in data blocks of the plurality of data blocks sent to the destination drive.

14. The software product of claim 12, further comprising computer instructions executable to update header information indicating a data block size in the one or more data blocks to include the padding.

15. The software product of claim 12, wherein the computer instructions are further executable to pad the one or more data blocks to a size specified by a write command sent by an initiator.

16. The software product of claim 12, wherein the computer instructions are further executable to pad the one or more data blocks to a size of a largest data block.

17. An appliance operable to adjust data blocks to drive specific criteria, the appliance comprising:

transfer logic configured to intercept a plurality of data blocks being sent to a destination drive, the destination drive being in a media library having a plurality of data storage devices and connected to the appliance, wherein the plurality of data blocks is from one or more hosts on one or more networks connected to the appliance;

encryption logic configured to encrypt data in one or more data blocks of the plurality of data blocks from the one or more hosts on the one or more networks connected to the appliance;

padding logic configured to:

determine drive specific criteria that are specific to the destination drive, wherein the drive specific criteria include a constant size specific to the destination drive; and pad the one or more data blocks to the constant size specific to the destination drive; and additional logic configured to write the plurality of padded data blocks over a small computer system interface (SCSI) to the destination drive in the media library using a SCSI variable write command.

18. The appliance of claim 17, wherein the padding logic is further configured to monitor the size of the data blocks of the plurality of data blocks and to pad one or more data blocks of the plurality of data blocks to a size of a largest data block of the plurality of data blocks.

19. The appliance of claim 17, wherein the padding logic is further configured to pad the plurality of data blocks to a size of a write command sent by an initiator.

20. The appliance of claim 17, further comprising compression logic configured to compress data in one or more data blocks of the plurality of data blocks.

* * * * *

UNITED STATES PATENT AND TRADEMARK OFFICE
CERTIFICATE OF CORRECTION

| | | |
|---|---|---|
| PATENT NO. | : 8,555,053 B1 | Page 1 of 1 |
| APPLICATION NO. | : 12/201956 | |
| DATED | : October 8, 2013 | |
| INVENTOR(S) | : Vitalo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this
Fourteenth Day of July, 2015

Michelle K. Lee
*Director of the United States Patent and Trademark Office*